United States Patent
Kuper et al.

(10) Patent No.: US 12,229,181 B2
(45) Date of Patent: *Feb. 18, 2025

(54) MEDIA SHARING ACROSS SERVICE PROVIDERS

(71) Applicant: Sonos, Inc., Santa Barbara, CA (US)

(72) Inventors: Ron Kuper, Arlington, MA (US); Joni Hoadley, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,578

(22) Filed: Nov. 28, 2022

(65) Prior Publication Data

US 2023/0205810 A1    Jun. 29, 2023

Related U.S. Application Data

(63) Continuation of application No. 17/008,362, filed on Aug. 31, 2020, now Pat. No. 11,514,099, which is a
(Continued)

(51) Int. Cl.
| | |
|---|---|
| *G06F 16/00* | (2019.01) |
| *G06F 16/2455* | (2019.01) |
| *G06F 16/44* | (2019.01) |
| *G06F 16/48* | (2019.01) |
| *G06F 16/635* | (2019.01) |
| *H04L 65/60* | (2022.01) |
| *H04L 67/10* | (2022.01) |

(52) U.S. Cl.
CPC ........ *G06F 16/48* (2019.01); *G06F 16/24562* (2019.01); *G06F 16/44* (2019.01); *G06F 16/635* (2019.01); *H04L 65/60* (2013.01); *H04L 67/10* (2013.01)

(58) Field of Classification Search
None
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| (Continued) | | |

FOREIGN PATENT DOCUMENTS

| | | |
|---|---|---|
| CN | 1833444 A | 9/2006 |
| CN | 101409657 A | 4/2009 |
| (Continued) | | |

OTHER PUBLICATIONS

Advisory Action mailed on Apr. 30, 2018, issued in connection with U.S. Appl. No. 14/971,796, filed Dec. 16, 2015, 2 pages.
(Continued)

*Primary Examiner* — Bai D Vu

(57) ABSTRACT

Embodiments including methods and apparatus to share file and file recommendations are disclosed. Data is received indicating a particular media item from a first service provider, where the particular media item is accessible from the first service provider according to a first pointer. A second pointer is identified in a database according to which the particular media item is accessible from a second service provider. Data indicating the second pointer is transmitted to a media playback system, via at least one of a WAN or a LAN.

20 Claims, 7 Drawing Sheets

Related U.S. Application Data continuation of application No. 16/142,689, filed on Sep. 26, 2018, now Pat. No. 10,762,124, which is a continuation of application No. 14/990,235, filed on Jan. 7, 2016, now Pat. No. 10,127,232, which is a continuation of application No. 13/239,077, filed on Sep. 21, 2011, now Pat. No. 9,286,384.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,108,686 A | 8/2000 | Williams, Jr. | |
| 6,256,554 B1 | 7/2001 | DiLorenzo | |
| 6,349,339 B1 | 2/2002 | Williams | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,826,283 B1 | 11/2004 | Wheeler et al. | |
| 6,985,694 B1 | 1/2006 | De Bonet et al. | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,739 B2 | 6/2007 | Chang | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,496,623 B2 | 2/2009 | Szeto et al. | |
| 7,496,633 B2 | 2/2009 | Szeto et al. | |
| 7,571,014 B1 | 8/2009 | Lambourne et al. | |
| 7,599,685 B2 | 10/2009 | Goldberg et al. | |
| 7,630,501 B2 | 12/2009 | Blank et al. | |
| 7,643,894 B2 | 1/2010 | Braithwaite et al. | |
| 7,657,224 B2 | 2/2010 | Goldberg et al. | |
| 7,657,910 B1 | 2/2010 | McAulay et al. | |
| 7,725,533 B2 | 5/2010 | Szeto et al. | |
| 7,725,551 B2 | 5/2010 | Szeto et al. | |
| 7,739,271 B2 | 6/2010 | Cook et al. | |
| 7,742,740 B2 | 6/2010 | Goldberg et al. | |
| 7,835,689 B2 | 11/2010 | Goldberg et al. | |
| 7,853,341 B2 | 12/2010 | McCarty et al. | |
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 7,941,761 B2 | 5/2011 | Hally et al. | |
| 7,987,294 B2 | 7/2011 | Bryce et al. | |
| 8,014,423 B2 | 9/2011 | Thaler et al. | |
| 8,023,663 B2 | 9/2011 | Goldberg | |
| 8,028,038 B2 | 9/2011 | Weel | |
| 8,028,323 B2 | 9/2011 | Weel | |
| 8,045,952 B2 | 10/2011 | Qureshey et al. | |
| 8,050,652 B2 | 11/2011 | Qureshey et al. | |
| 8,103,009 B2 | 1/2012 | McCarty et al. | |
| 8,214,873 B2 | 7/2012 | Weel | |
| 8,230,099 B2 | 7/2012 | Weel | |
| 8,234,395 B2 | 7/2012 | Millington | |
| 8,396,800 B1 | 3/2013 | Wieder | |
| 8,483,853 B1 | 7/2013 | Lambourne | |
| 8,566,722 B2 * | 10/2013 | Gordon | H04N 21/23617 715/845 |
| 8,788,514 B1 | 7/2014 | Ramanarayanan et al. | |
| 8,942,252 B2 | 1/2015 | Balassanian et al. | |
| 9,344,755 B2 | 5/2015 | Vega et al. | |
| 9,489,383 B2 | 11/2016 | Hyman et al. | |
| 9,529,979 B2 | 12/2016 | Torgerson et al. | |
| 9,547,647 B2 | 1/2017 | Badaskar et al. | |
| 9,667,679 B2 | 5/2017 | Lang et al. | |
| 9,674,587 B2 | 6/2017 | Triplett et al. | |
| 9,699,522 B2 | 7/2017 | Kim et al. | |
| 9,967,615 B2 | 5/2018 | Coburn, IV et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0056117 A1 | 5/2002 | Hasegawa et al. | |
| 2002/0124097 A1 | 9/2002 | Isely et al. | |
| 2002/0144273 A1 | 10/2002 | Reto | |
| 2002/0154691 A1 | 10/2002 | Kost et al. | |
| 2003/0001016 A1 | 1/2003 | Fraier et al. | |
| 2003/0157951 A1 | 8/2003 | Hasty, Jr. | |
| 2004/0024478 A1 | 2/2004 | Hans et al. | |
| 2004/0072584 A1 | 4/2004 | Kern | |
| 2004/0088328 A1 | 5/2004 | Cook et al. | |
| 2004/0143603 A1 | 7/2004 | Kaufmann et al. | |
| 2005/0256722 A1 | 11/2005 | Clark et al. | |
| 2006/0047704 A1 | 3/2006 | Gopalakrishnan | |
| 2006/0095401 A1 | 5/2006 | Krikorian et al. | |
| 2006/0143236 A1 | 6/2006 | Wu | |
| 2006/0149850 A1 | 7/2006 | Bowman | |
| 2006/0200545 A1 | 9/2006 | Fromentoux et al. | |
| 2006/0253436 A1 | 11/2006 | Cook et al. | |
| 2007/0088747 A1 | 4/2007 | Cheng et al. | |
| 2007/0100966 A1 | 5/2007 | Peng et al. | |
| 2007/0107019 A1 | 5/2007 | Romano et al. | |
| 2007/0142944 A1 | 6/2007 | Goldberg et al. | |
| 2007/0294131 A1 | 12/2007 | Roman et al. | |
| 2008/0052371 A1 | 2/2008 | Partovi et al. | |
| 2008/0056675 A1 | 3/2008 | Wright et al. | |
| 2008/0104268 A1 | 5/2008 | Farber et al. | |
| 2008/0189293 A1 | 8/2008 | Strandel et al. | |
| 2008/0205856 A1 | 8/2008 | Kim et al. | |
| 2009/0100147 A1 | 4/2009 | Igarashi | |
| 2009/0136210 A1 | 5/2009 | Morimoto | |
| 2009/0150491 A1 | 6/2009 | Yamamoto | |
| 2009/0180534 A1 | 7/2009 | Hluchyj et al. | |
| 2009/0204842 A1 | 8/2009 | Tetik et al. | |
| 2009/0222514 A1 | 9/2009 | Igarashi | |
| 2009/0307062 A1 | 12/2009 | Lutnick et al. | |
| 2010/0017366 A1 | 1/2010 | Robertson et al. | |
| 2010/0075313 A1 | 3/2010 | Kreuwel et al. | |
| 2010/0095332 A1 | 4/2010 | Gran et al. | |
| 2010/0128176 A1 | 5/2010 | Nakajima et al. | |
| 2010/0205222 A1 | 8/2010 | Gajdos et al. | |
| 2010/0262909 A1 | 10/2010 | Hsieh | |
| 2010/0281108 A1 | 11/2010 | Cohen | |
| 2011/0004468 A1 | 1/2011 | Fusakawa et al. | |
| 2011/0246623 A1 | 10/2011 | Pantos et al. | |
| 2011/0276396 A1 * | 11/2011 | Rathod | G06Q 30/0282 707/706 |
| 2012/0071996 A1 | 3/2012 | Svendsen | |
| 2012/0117183 A1 | 5/2012 | Wong et al. | |
| 2012/0210225 A1 | 8/2012 | McCoy et al. | |
| 2012/0210353 A1 | 8/2012 | Wong et al. | |
| 2013/0070860 A1 | 3/2013 | Schramm et al. | |
| 2013/0198298 A1 | 8/2013 | Li et al. | |
| 2013/0263193 A1 | 10/2013 | Hirano et al. | |
| 2013/0268980 A1 | 10/2013 | Russell | |
| 2013/0343567 A1 | 12/2013 | Triplett et al. | |
| 2014/0010515 A1 | 1/2014 | Lee et al. | |
| 2014/0093085 A1 | 4/2014 | Jarvis et al. | |
| 2014/0189648 A1 | 7/2014 | Everitt | |
| 2014/0323036 A1 | 10/2014 | Daley et al. | |
| 2015/0025661 A1 | 1/2015 | Vega-Zayas et al. | |
| 2015/0036695 A1 | 2/2015 | Gowda et al. | |
| 2015/0067016 A1 | 3/2015 | Park et al. | |
| 2015/0150146 A1 | 5/2015 | Torgerson et al. | |
| 2015/0172756 A1 | 6/2015 | Coburn, IV et al. | |
| 2015/0179227 A1 | 6/2015 | Russell | |
| 2015/0234820 A1 | 8/2015 | Aravamudan et al. | |
| 2015/0293917 A1 | 10/2015 | Bufe, III et al. | |
| 2016/0078903 A1 | 3/2016 | Chitnis et al. | |
| 2016/0080739 A1 | 3/2016 | Perlman et al. | |
| 2016/0088037 A1 | 3/2016 | Lang | |
| 2016/0088339 A1 | 3/2016 | Nakanishi | |
| 2016/0100031 A1 | 4/2016 | Wood et al. | |
| 2016/0150344 A1 | 5/2016 | Filev et al. | |
| 2016/0269128 A1 | 9/2016 | Gautama et al. | |
| 2017/0026686 A1 | 1/2017 | Glazier et al. | |

(56) References Cited

U.S. PATENT DOCUMENTS

| | | | |
|---|---|---|---|
| 2017/0093943 | A1 | 3/2017 | Alsina et al. |
| 2017/0171577 | A1 | 6/2017 | Kipp |
| 2017/0251040 | A1 | 8/2017 | Archambault et al. |
| 2017/0289231 | A1 | 10/2017 | Powell et al. |
| 2020/0117416 | A1 | 4/2020 | Vega Zayas et al. |

FOREIGN PATENT DOCUMENTS

| | | |
|---|---|---|
| CN | 101552945 A | 10/2009 |
| CN | 103959323 B | 5/2018 |
| EP | 1389853 A1 | 2/2004 |
| EP | 2548379 A1 | 1/2013 |
| EP | 2648111 A1 | 10/2013 |
| JP | 2008500614 A | 1/2008 |
| JP | 2009141746 A | 6/2009 |
| KR | 100890993 | 3/2009 |
| WO | 200153994 | 7/2001 |
| WO | 2003093950 A2 | 11/2003 |
| WO | 2005119948 A2 | 12/2005 |

OTHER PUBLICATIONS

Audio Tron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, Chinese Office Action mailed on May 5, 2016, issued in connection with Chinese Patent Application No. 201280056773.0, 18 pages.
Chinese Patent Office, First Office Action and Translation mailed on Mar. 4, 2021, issued in connection with Chinese Application No. 201810356722.9, 14 pages.
Chinese Patent Office, Second Office Action mailed on Jan. 20, 2017, issued in connection with Chinese Application No. 201280056773.0, 15 pages.
Chinese Patent Office, Third Office Action mailed on Sep. 26, 2017, issued in connection with Chinese Application No. 201280056773.0, 4 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report mailed on Jan. 26, 2016, issued in connection with European Application No. 12833511.4, 6 pages.
European Patent Office, European Extended Search Report mailed on Mar. 8, 2018, issued in connection with EP Application No. 17198086.5, 5 pages.
European Patent Office, European Office Action mailed on Jul. 30, 2019, issued in connection with European Application No. 16828813.2, 9 pages.
European Patent Office, European Search Report mailed on Dec. 7, 2021, issued in connection with European Application No. 21182253.1, 11 pages.
European Patent Office, Office Action mailed on Sep. 29, 2016, issued in connection with European Application No. 12833511.4, 6 pages.
European Patent Office, Summons to Attend Oral Proceedings mailed on May 12, 2020, issued in connection with European Application No. 16828813.2, 8 pages.
Final Office Action mailed Jun. 12, 2015, issued in connection with U.S. Appl. No. 13/239,077, filed Sep. 21, 2011, 21 pages.
Final Office Action mailed on Jul. 12, 2018, issued in connection with U.S. Appl. No. 14/990,283, filed Jan. 7, 2016, 14 pages.
Final Office Action mailed on Jul. 15, 2019, issued in connection with U.S. Appl. No. 15/973,443, filed May 7, 2018, 26 pages.
Final Office Action mailed on Jan. 18, 2018, issued in connection with U.S. Appl. No. 14/971,796, filed Dec. 16, 2015, 17 pages.
Final Office Action mailed on Jun. 29, 2018, issued in connection with U.S. Appl. No. 14/990,235, filed Jan. 7, 2016, 11 pages.
First Action Interview Office Action mailed on Mar. 7, 2019, issued in connection with U.S. Appl. No. 15/973,443, filed May 7, 2018, 4 pages.
International Bureau, International Preliminary Report on Patentability mailed on Apr. 3, 2014, issued in connection with International Application No. PCT/US2012/056467, filed on Sep. 21, 2011, 11 pages.
International Bureau, International Preliminary Report on Patentability, mailed on Jun. 28, 2018, issued in connection with International Application No. PCT/US2016/065640, filed on Dec. 16, 2015, 12 pages.
International Searching Authority, International Search Report and Written Opinion mailed on Feb. 24, 2017, issued in connection with International Application No. PCT/US2016/065640, filed on Dec. 8, 2016, 15 pages.
International Searhing Authority, International Search Report and Written Opinion mailed on Feb. 28, 2013, issued in connection with International Application No. PCT/US2012/056467, filed on Sep. 21, 2012, 12 pages.
Japanese Patent Office, Final Office Action mailed on Mar. 8, 2016, issued in connection with Japanese Patent Application No. JP2014-531990, 10 pages.
Japanese Patent Office, Final Office Action mailed on Aug. 16, 2016, issued in connection with Japanese Patent Application No. 2014-531990, 6 pages.
Japanese Patent Office, Office Action mailed on Jun. 13, 2017, issued in connection with Japanese patent application No. 2016-113766, 7 pages.
Japanese Patent Office, Translation of Office Action mailed on Jun. 13, 2017, issued in connection with Japanese Patent Application No. 2016-113766, 3 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed Oct. 21, 2014, issued in connection with U.S. Appl. No. 13/239,077, filed Sep. 21, 2011, 18 pages.
Non-Final Office Action mailed Apr. 25, 2013, issued in connection with U.S. Appl. No. 13/239,077, filed Sep. 21, 2011, 21 pages.
Non-Final Office Action mailed on Dec. 1, 2017, issued in connection with U.S. Appl. No. 14/990,235, filed Jan. 7, 2016, 18 pages.
Non-Final Office Action mailed on Aug. 10, 2017, issued in connection with U.S. Appl. No. 14/971,796, filed Dec. 16, 2015, 17 pages.
Non-Final Office Action mailed on Feb. 16, 2022, issued in connection with U.S. Appl. No. 17/008,362, filed Aug. 31, 2020, 11 pages.
Non-Final Office Action mailed on Jun. 23, 2020, issued in connection with U.S. Appl. No. 16/696,316, filed Nov. 26, 2019, 25 pages.
Non-Final Office Action mailed on Oct. 25, 2022, issued in connection with U.S. Appl. No. 17/745,726, filed May 16, 2022, 14 pages.
Non-Final Office Action mailed on Apr. 26, 2023, issued in connection with U.S. Appl. No. 18/149,135, filed Jan. 2, 2023, 20 pages.
Non-Final Office Action mailed on Dec. 6, 2017, issued in connection with U.S. Appl. No. 14/990,283, filed Jan. 7, 2016, 20 pages.
Non-Final Office Action mailed on Jan. 9, 2020, issued in connection with U.S. Appl. No. 16/142,689, filed Sep. 26, 2018, 9 pages.

(56) References Cited

OTHER PUBLICATIONS

Notice of Allowance mailed on Oct. 7, 2019, issued in connection with U.S. Appl. No. 16/154,685, filed Oct. 8, 2018, 10 pages.
Notice of Allowance mailed on Dec. 9, 2015, issued in connection with U.S. Appl. No. 13/239,077, filed Sep. 21, 2011, 9 pages.
Notice of Allowance mailed on Jan. 9, 2018, issued in connection with U.S. Appl. No. 15/280,979, filed Sep. 29, 2016, 14 pages.
Notice of Allowance mailed on Oct. 9, 2019, issued in connection with U.S. Appl. No. 15/973,443, filed May 7, 2018, 5 pages.
Notice of Allowance mailed on Jan. 12, 2022, issued in connection with U.S. Appl. No. 17/128,696, filed Dec. 21, 2020, 9 pages.
Notice of Allowance mailed on Sep. 16, 2020, issued in connection with U.S. Appl. No. 16/798,936, filed Feb. 24, 2020, 19 pages.
Notice of Allowance mailed on Oct. 19, 2020, issued in connection with U.S. Appl. No. 16/696,316, filed Nov. 26, 2019, 5 pages.
Notice of Allowance mailed on Sep. 19, 2018, issued in connection with U.S. Appl. No. 14/990,235, filed Jan. 7, 2016, 10 pages.
Notice of Allowance mailed on Dec. 20, 2021, issued in connection with U.S. Appl. No. 17/135,306, filed Dec. 28, 2020, 24 pages.
Notice of Allowance mailed on Apr. 22, 2020, issued in connection with U.S. Appl. No. 16/142,689, filed Sep. 26, 2018, 8 pages.
Notice of Allowance mailed on Nov. 23, 2022, issued in connection with U.S. Appl. No. 17/745,726, filed May 16, 2022, 5 pages.
Notice of Allowance mailed on Sep. 23, 2022, issued in connection with U.S. Appl. No. 17/008,362, filed Aug. 31, 2020, 9 pages.
Notice of Allowance mailed on Oct. 25, 2018, issued in connection with U.S. Appl. No. 14/990,283, filed Jan. 7, 2016, 10 pages.
Notice of Allowance mailed on Jul. 26, 2018, issued in connection with U.S. Appl. No. 14/971,796, filed Dec. 16, 2015, 15 pages.
Notice of Allowance mailed on May 27, 2022, issued in connection with U.S. Appl. No. 17/008,362, filed Aug. 31, 2020, 9 pages.
Notice of Allowance mailed on Oct. 28, 2020, issued in connection with U.S. Appl. No. 16/798,936, filed Feb. 24, 2020, 5 pages.
Palm, Inc., "Handbook for the Palm VII Handheld," May 2000, 311 pages.
Pre-Brief Appeal Conference Decision mailed on Sep. 14, 2018, issued in connection with U.S. Appl. No. 14/990,235, filed Jan. 7, 2016, 2 pages.
Preinterview First Office Action mailed on Aug. 29, 2017, issued in connection with U.S. Appl. No. 15/280,979, filed Sep. 29, 2016, 6 pages.
Preinterview First Office Action mailed on Nov. 5, 2018, issued in connection with U.S. Appl. No. 15/973,443, filed May 7, 2018, 5 pages.
Presentations at WinHEC 2000, May 2000, 138 pages.
United States Patent and Trademark Office, U.S. Appl. No. 14/971,796, filed Dec. 16, 2015, entitled "Synchronization of Content Between Networked Devices", 68 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.

* cited by examiner

MEDIA SHARING ACROSS SERVICE PROVIDERS

CROSS-REFERENCE TO RELATED APPLICATIONS

This application claims priority under 35 U.S.C. § 120 to, and is a continuation of, U.S. patent application Ser. No. 17/008,362 filed Aug. 31, 2020 and entitled "Media Sharing Across Service Providers," which is a continuation of U.S. patent application Ser. No. 16/142,689 filed Sep. 26, 2018 and entitled "Media Sharing Across Service Providers," which is a continuation of U.S. patent application Ser. No. 14/990,235 filed Jan. 7, 2016 and entitled "Media Sharing Across Service Providers," which is a continuation of U.S. patent application Ser. No. 13/239,077 filed Sep. 21, 2011 and entitled "Methods and Systems to Share Media," the contents of each of which are hereby incorporated by reference in their entirety for all purposes.

FIELD OF THE DISCLOSURE

The disclosure is related to digital content and, more particularly, to methods and systems to share media.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content.

BRIEF DESCRIPTION OF THE DRAWINGS

Features, aspects, and advantages of the presently disclosed technology are better understood with regard to the following description, appended claims, and accompanying drawings where:

Figure 1:
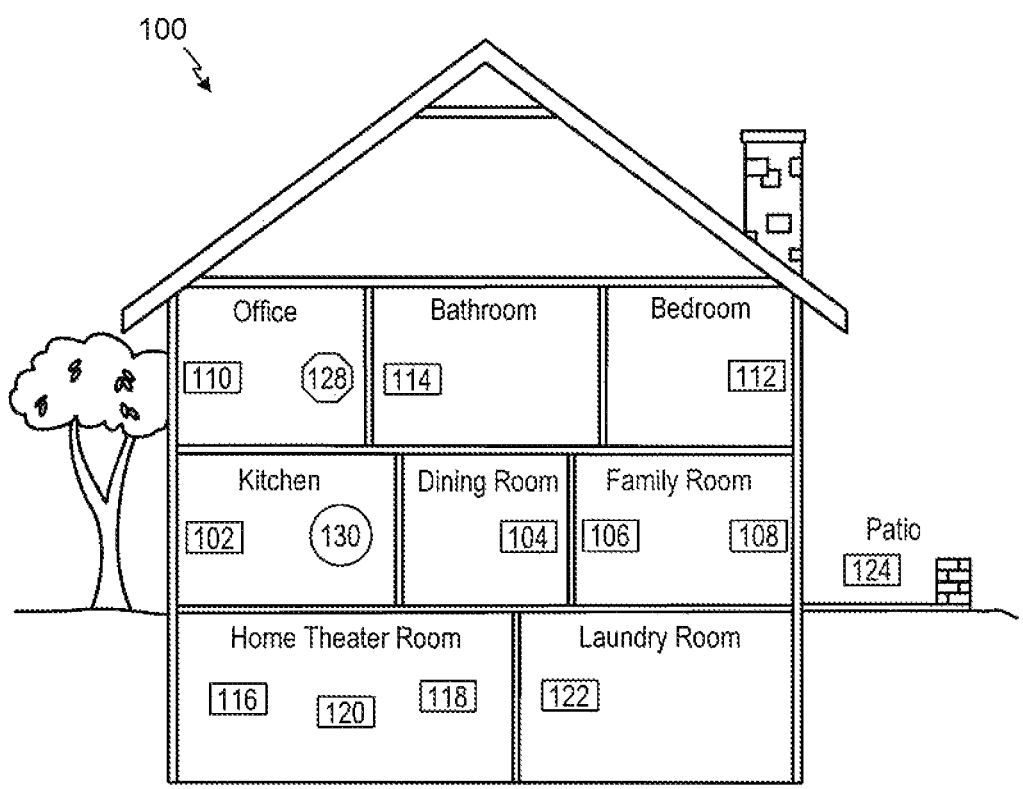
FIG. 1 shows an illustration of an example system in which embodiments of the methods and apparatus disclosed herein may be implemented.

In addition, the drawings are for the purpose of illustrating example embodiments, but it is understood that the present disclosure is not limited to the arrangements and instrumentality shown in the drawings.

DETAILED DESCRIPTION

I. Overview

Certain embodiments disclosed herein enable media sharing in a social context. Certain embodiments disclosed herein enable improved integration of users who may subscribe to different online media services. Certain embodiments disclosed herein provide music sharing in a social network. Certain embodiments disclosed herein make use of networked audio systems in two or more households to allow media sharing amongst those two or more households via the networked audio systems. Certain embodiments described herein provide cross-service linking amongst media providers. Certain embodiments described herein provide route-to-best media searching. Additional embodiments are described herein.

For example, in an embodiment such as described more below, media such as, for example, music can be shared amongst users who might not otherwise have access to the same file on a shared storage medium and/or do not have access to the same online music service (Rhapsody™ MOG, Napster™, and Spotify™ are all current examples of an online music service). Online music services may be free or based on a paid subscription. Most often, if not every time, an online music services requires a user to register with the service.

Assume for this example that a music playlist of a first user is made available to or shared with a second user. The music playlist may contain a list of track titles and the artist and/or album associated with the track title. The music playlist may contain one or more track titles. Additionally, in this example, the first and second users do not have access to the same file on a shared storage medium and do not have access to the same online music service.

The music playlist may be made available to, or shared with, the second user in a number of ways, such as by making the playlist available on a social site like Facebook or via a social service system made available by a consumer electronics company to improve the social experience of music through its many households of networked audio systems (e.g., Sonos manufactures and sells networked audio systems and such a system may offer a social portal for connecting households though the sharing of media), sending it via email, text, instant messaging and/or Twitter, posting the playlist in a digital magazine or website where the second user can access it and/or providing the playlist to the second user through some other known or future developed method or system.

To play one or more songs selected from the playlist by the second user, the system or some aspect thereof, such as described more below, may search for the music file that best pertains to (or matches) the selected track title in the second user's local library of music and/or initiate a search at an online music service subscribed to by the second user, if any and which can be a different online music service from the first user.

Subsequent to a successful search, the second user's system may retrieve and play the music at that time or add the music (e.g., with a proper pointer to a source of the second user) to a queue or holding place to be played at a later time. If the system cannot successfully locate the music, then it may indicate that result to the second user and/or provide an option on how to obtain the music (e.g., providing a URL link to purchase the music). Note that in some embodiments, a software application written for the online music service (the program may be referred to as a "media player"), subscribed to by the second user, may be the program that enables playback of the music via computer speakers or an audio system in communication with the program. The media player may be automatically launched upon determining that the second user is a subscriber to the music service or at some time later to enable music playback.

Depending on the search and the system configuration, the actual track played by the second user may be from the same or different album as the track title from the playlist. In one example, the recommended song and the song retrieved by the second user might both be digital copies from the same album. In another example, the recommended song might be a digital copy from the original album, whereas the song retrieved by the second user may be a digital copy from a greatest hits album.

Additionally, depending on the search and the system configuration, the actual track played may be determined based in part on the quality of the music file. That is, in some embodiments, the higher quality music file may be played, if two or more music files pertaining to the selected track are found. In an alternative embodiment, the lower quality music file is played, if two or music files are found, so that less bandwidth may be consumed.

Moving on from the above illustration, an example embodiment of a method of sharing or matching music includes reading a music reference from a first user for a second user. The first user using a first music access service to access music. The example method also includes identifying a music file associated with the music reference and identifying a second music access service different than the first music access service used by second user to access the music. In addition, the example method includes using the second music access service to at least one of play, point to, or queue the music file.

In some embodiments, a "reference" from a user may be an active reference or recommendation (e.g., the user offers a particular recommendation). In some embodiments, a "reference" may be based on some other defined criteria (e.g., the user's listening or watching habits). In some embodiments, a "reference" is a comment, an opinion, or a suggestion. In other examples, the "reference" may be a gift such as, for example, where a first user purchases a music track for a second user.

Some example methods also include receiving a music request from the second user in response to the music reference prior to using the second music access service to at least one of play, point to, or queue the music file.

In some example methods, using the second music access service to at least one of play, point to, or queue the music file comprises searching online and/or in a local storage for the music file.

Also, some example methods include using a third music access service used by the second user to access music in place of the second music access service to at least one of play, point to, or queue the music file where the third music access service provides at least one of less expensive access to the music than the second music access service or higher quality music files than the second music access service.

An example apparatus implemented in accordance with the present disclosure includes an interface to receive a file recommendation by a first user recommending a file and a verifier to detect a first service used by the first user and to detect a second service used by a second user. The example system also includes an encoder to associate a first service identification code with the file recommendation based on the first service used by the first user. In addition, the example system includes a searcher to search one or more of a local library or a network-accessible database for a second service identification code associated with the file based on the second service. In the system the encoder is to associate the second service identification code with the file, as well. In addition, the example includes a playback engine to provide the file recommendation with the first service identification code to the second user where the second service and the first service are the same service or to provide the file recommendation with the second service identification code to the second user where the second service and the first service are different services. The example system further includes a database to store a record associating one or more of the first service identification code or the second service identification code with the file recommendation.

In some embodiments, a "recommendation" from a user may be an active reference or recommendation (e.g., the user offers a particular recommendation). In some embodiments, a "recommendation" may be based on some other defined criteria (e.g., the user's listening or watching habits). In some embodiments a "recommendation" is synonymous with a "reference" described above.

In some embodiments, the first user specifies the second user in the file recommendation and the searcher automatically searches for the second service identification code associated with the file. In some examples, the service identification codes include information related to one or more of the specific service or the specific file. For example, a service identification code for Michael Jackson's song "Beat It" on Spotify may include information related to one or more of the Spotify service itself, the song title "Beat It", the artist Michael Jackson, the album "Thriller" and/or any of the genres pop, R&B, rock and/or funk.

In some embodiments, the file is a music file. Also, in some embodiments, the music file is one or more of a track, an artist, an album, a playlist, a station or a genre. In other embodiments, the file is a video and audio file (e.g., a movie or television show).

In some embodiments, the encoder is to associate metadata with the file recommendation and the searcher is to locate the file based on the metadata when the second user does not use a second service.

In some embodiments, the database is to store a list of connections for the first user to form a social network. Also, in some embodiments, the example system includes an updater to dynamically inform the first user of additional file recommendations recommended by the connections.

In some embodiments, the playback engine automatically adds the file with the second service identification to a playlist at a playback device of the second user. In addition, in some embodiments, the playlist is currently playing.

In some embodiments, one of the first service or the second service is one or more of a music service, radio service, an online radio service or an online streaming music service.

In some embodiments, the interface is to receive an indication of the enjoyment level of the second user with respect to the file and the searcher to search for additional file recommendations based on the enjoyment level.

Another example method implemented in accordance with the present disclosure includes verifying a first service used by a first user upon receipt of a file recommendation by a first user recommending a file and encoding a first service identification code with the file based on the first service. The example method also includes verifying a second service used by a second user upon one or more of receipt of a file request by the second user or detection of a mention of the second user in the file recommendation. In addition, the example method includes searching one or more of a local library or a network-accessible database for a second service identification code associated with the file based on the second service. Furthermore, the example method includes encoding the second service identification with the file. The example method also includes providing the file recommendation with the first service identification code to the second user where the second service and the first service are the same service or providing the file recommendation with the second service identification code to the second user where the second service and the first service are different services. In addition, the example method includes storing a record associating one or more of the first service identification code or the second service identification code with the file.

In some embodiments, the example method includes encoding metadata with the file recommendation and locating the file based on the metadata when the second user does not use a second service.

In some embodiments, the method includes storing a list of connections for the first user to form a social network. Also, in some embodiments, the method includes dynamically informing the first user of additional file recommendations recommended by the connections In some embodiments, the method includes automatically adding the file with the second service identification to a playlist at a playback device of the second user.

In some embodiments, the method further includes receiving an indication of the enjoyment level of the second user with respect to the file and searching for additional file recommendations based on the enjoyment level.

An example tangible machine-readable medium has instructions stored thereon implemented in accordance with the present disclosure that when executed, cause a machine to at least verify a first service used by a first user upon receipt of a file recommendation by a first user recommending a file and encode a first service identification code with the file based on the first service. The instructions, when executed, further cause the machine to verify a second service used by a second user upon one or more of receipt of a file request by the second user or detection of a mention of the second user in the file recommendation and search one or more of a local library or a network-accessible database for a second service identification code associated with the file based on the second service. The example instructions also cause the machine to encode the second service identification with the file. In addition, the example instructions cause the machine to provide the file recommendation with the first service identification code to the second user where the second service and the first service are the same service or providing the file recommendation with the second service identification code to the second user where the second service and the first service are different services. The example instructions further cause the machine to store a record associating one or more of the first service identification code or the second service identification code with the file.

In some embodiments, the example instructions cause the machine to encode metadata with the file recommendation and locate the file based on the metadata when the second user does not use a second service.

In some embodiments, the example instructions cause the machine to store a list of connections for the first user to form a social network. Also, in some embodiments, the example instructions cause the machine to dynamically inform the first user of additional file recommendations recommended by the connections In some embodiments, the example instructions cause the machine to automatically add the file with the second service identification to a playlist at a playback device of the second user.

In some embodiments, the example instructions cause the machine to receive an indication of the enjoyment level of the second user with respect to the file and search for additional file recommendations based on the enjoyment level.

In some embodiments, a user can choose to "recommend" an artist and/or album and/or track. By choosing to recommend the media, an internal, service-specific identifier is encoded with the recommendation in a database for a set of users, such as friends. For example, if a user recommends a track using the online music service, Rhapsody, the system would encode a Rhapsody ID in the recommendation, so that when other users (e.g., his or her friends) see what is recommended the system will play if the other users happen to also have a Rhapsody account. In addition, the address book (e.g., a list of friends) could be stored on a centralized server and accessible through an audio system controller, such as described in FIG. 3 below, for example.

In some embodiments, the system could also allow for tracks on one music service to be played on another, by utilizing a search function. When the system gets an ID for a shared track, and discovers that the user does not have a subscription to that service, the system could then request the metadata (album/artist/title) for the track and run a search on whatever music service (and local library) is presently available. The actual list of artists/albums/tracks that the friends have recommended is treated by the system as a library item, so that the recommendations can be dynamically updated.

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory, DVD, CD, Blu-ray, etc., storing the software and/or firmware.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure may be practiced without certain, specific details. In other instances, well known methods, procedures, components, and circuitry have not been described in detail to avoid unnecessarily obscuring aspects of the embodiments.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

II. Example Environment

Referring now to the drawings, in which like numerals may refer to like parts throughout the figures. FIG. 1 shows an example system configuration 100 in which one or more of the method and/or apparatus disclosed herein may be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone may cover more than one room or space. One or more of zone players 102-124 are shown in each respective zone. A zone player 102-124, also referred to as a playback device, multimedia unit, speaker, etc., provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
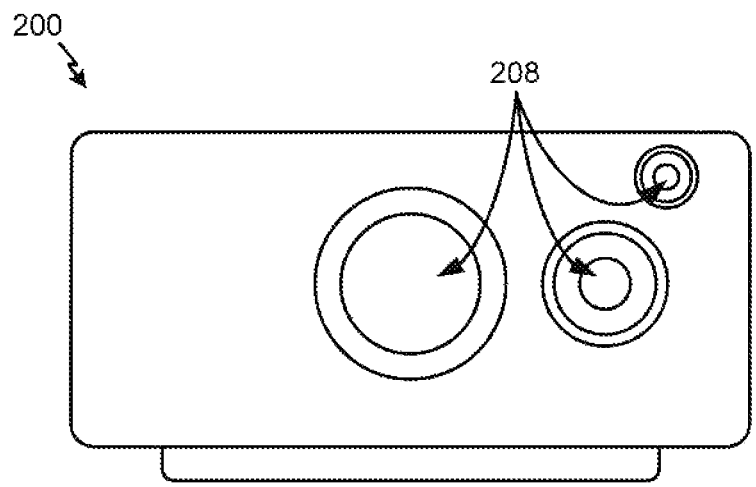
FIG. 2A shows an illustration of an example zone player having a built-in amplifier and speakers.
Figure 2B:
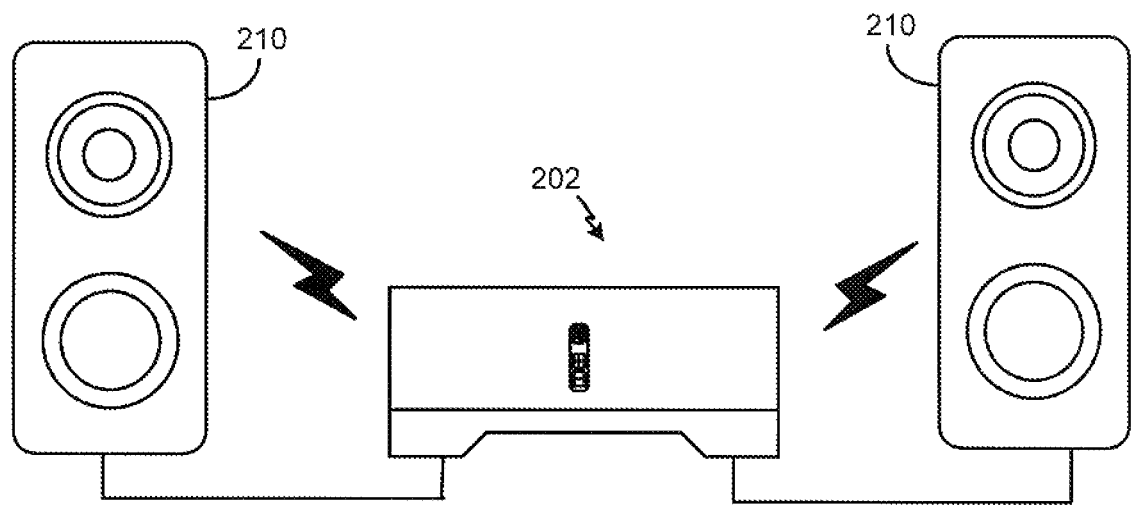
FIG. 2B shows an illustration of an example zone player having a built-in amplifier and connected to external speakers.
Figure 2C:
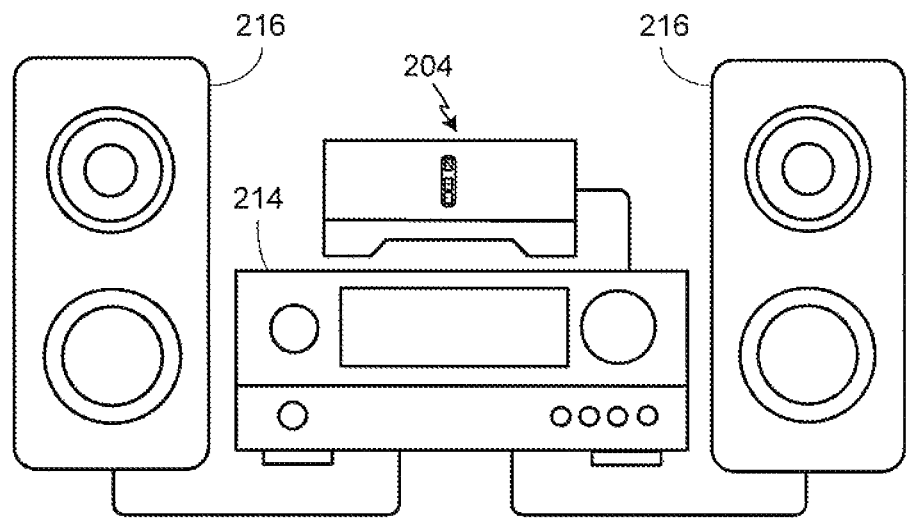
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, may correspond to any of the zone players 102-124 of FIG. 1. While certain embodiments provide multiple zone players, an audio output may be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer. In certain embodiments, the zone player 200 of FIG. 2A may be configured to play stereophonic audio or monaural audio. As described in greater detail below, in some embodiments, the example zone player 200 of FIG. 2A can also transmit a second signal to, for example, other zone player(s) in the same or different zone(s), speaker(s), receiver(s), etc. Transmission of the second signal may be part of, for example, a system in which multiple zone players, speakers, receivers, etc. form a network to, for example, present media content in a synchronization or distributed manner.

The example zone player 202 of FIG. 2B includes a built-in amplifier (not shown in this illustration) to power a set of detached speakers 210. The speakers 210 of FIG. 2B may include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), etc.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), etc.

Example zone players include a "Sonos® S5," "Sonos Play:5," "ZonePlayer 120," and "ZonePlayer 90," which are offered by Sonos, Inc. of Santa Barbara, California. A zone player may also be referred to herein as a playback device, and a zone player is not limited to the particular examples illustrated in FIGS. 2A, 2B, and 2C. For example, a zone player may include a wired or wireless headphone. In another example, a zone player might include a subwoofer. In an example, a zone player may include or interact with a docking station for an Apple iPod™ or similar device. In some embodiments, a zone player may relay one or more signals received from, for example, a first zone player to another playback device. In some embodiments, a zone player may receive a first signal and generate an output corresponding to the first signal and, simultaneously or separately, may receive a second signal and transmit or relay the second signal to another zone player(s), speaker(s), receiver(s), etc. Thus, an example zone player described herein can act as a playback device and, at the same time, operate as a hub in a network of zone players. In such instances, media content corresponding to the first signal may be different from the media content corresponding to the second signal.

Figure 3:
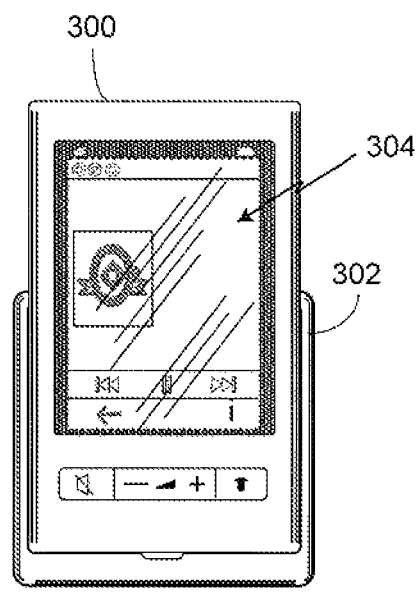
FIG. 3 shows an illustration of an example controller.

FIG. 3 shows an example illustration of a wireless controller 300 in a docking station 302. The controller 300 may correspond to the controlling device 130 of FIG. 1. The controller 300 is provided with a touch screen 304 that allows a user to interact with the controller 300 to, for example, retrieve and navigate a playlist of audio items, control operations of one or more zone players, and provide overall control of the system configuration 100. In addition, the controller 300 may provide a social portal through which users can share, among other things, playlists with users of other households. In certain embodiments, any number of controllers may be used to control the system configuration 100. In certain embodiments, there may be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device may be used as a controller by connecting to the data network 128. An application running on a laptop or desktop PC or Mac may also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, California.

Referring back to the system configuration 100 of FIG. 1, a particular zone may contain one or more zone players. For example, the family room of FIG. 1 contains two zone players 106 and 108, while the kitchen is shown with one zone player 102. Zones may be dynamically configured by positioning a zone player in a room or space and assigning via the controller 130 the zone player to a new or existing zone. As such, zones may be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network may be distributed in and around the system configuration 100.

Particularly, the data network 128 may be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 may further allow access to a wide area network, such as the Internet.

In certain embodiments, the data network 128 may be created by connecting any of the zone players 102-124, or some other connecting device, to a broadband router. Other zone players 102-124 may then be added wired or wirelessly to the data network 128. For example, a zone player (e.g., any of zone players 102-124) may be added to the system configuration 100 by simply pressing a button on the zone player itself, which enables a connection to be made to the data network 128. The broadband router may be connected to an Internet Service Provider (ISP), for example. The broadband router may be used to form another data network within the system configuration 100, which may be used in other applications (e.g., web surfing). The data network 128 may also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones may be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone may be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 may be configured to play the same audio source in synchrony, or the two zone players 106 and 108 may be paired to play two separate sounds in left and right channels, for example. In other words, the stereo effects of a sound may be reproduced or enhanced through the two zone players 106 and 108, one for the left sound and the other for the right sound. In certain embodiments, paired zone players may play audio in synchrony with other zone players.

In certain embodiments, three or more zone players may be configured to play various channels of audio that is encoded with three channels or more sound. For example, the home theater room shows zone players 116, 118, and 120. If the sound is encoded as 2.1 channel audio, then the zone player 116 may be configured to play left channel audio, the zone player 118 may be configured to play right channel audio, and the zone player 120 may be configured to play bass frequencies. Other configurations are possible and depend on the number of zone players and the type of audio. Further, a particular zone may be configured to play a 5.1 channel audio in one instance, such as when playing audio from a movie, and then dynamically switch to play stereo, such as when playing audio from a two channel source.

In certain embodiments, two or more zone players may be sonically consolidated to form a single, consolidated zone player. A consolidated zone player (though made up of multiple, separate devices) may be configured to process and reproduce sound differently than an unconsolidated zone player or zone players that are paired, because a consolidated zone player will have additional speaker drivers from which sound may be passed. The consolidated zone player may further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) may be accessed via the data network 128 and played. Internet radio stations, shows, and podcasts may be accessed via the data network 128. Music services that let a user stream and download music and audio content may be accessed via the data network 128. Further, music may be obtained from traditional sources, such as a turntable or CD player, via a line-in connection to a zone player, for example. Audio content may also be accessed through AirPlay™ wireless technology by Apple, Inc., for example. Audio content received from one or more sources may be shared amongst the zone players 102 to 124 via the data network 128 and/or the controller 130.

Regardless of where a user of the system configuration 100 obtains access to his or her audio, the user may share his or her listening experience with a user of a different system configuration, such as a different household. As such, an account holder on a subscription service may share songs with account holders of other subscriptions services. In addition, search capabilities allow songs to be shared across music services or in a local library, by searching for the artist, album, and/or title.

III. Example Media Share System

Figure 4:
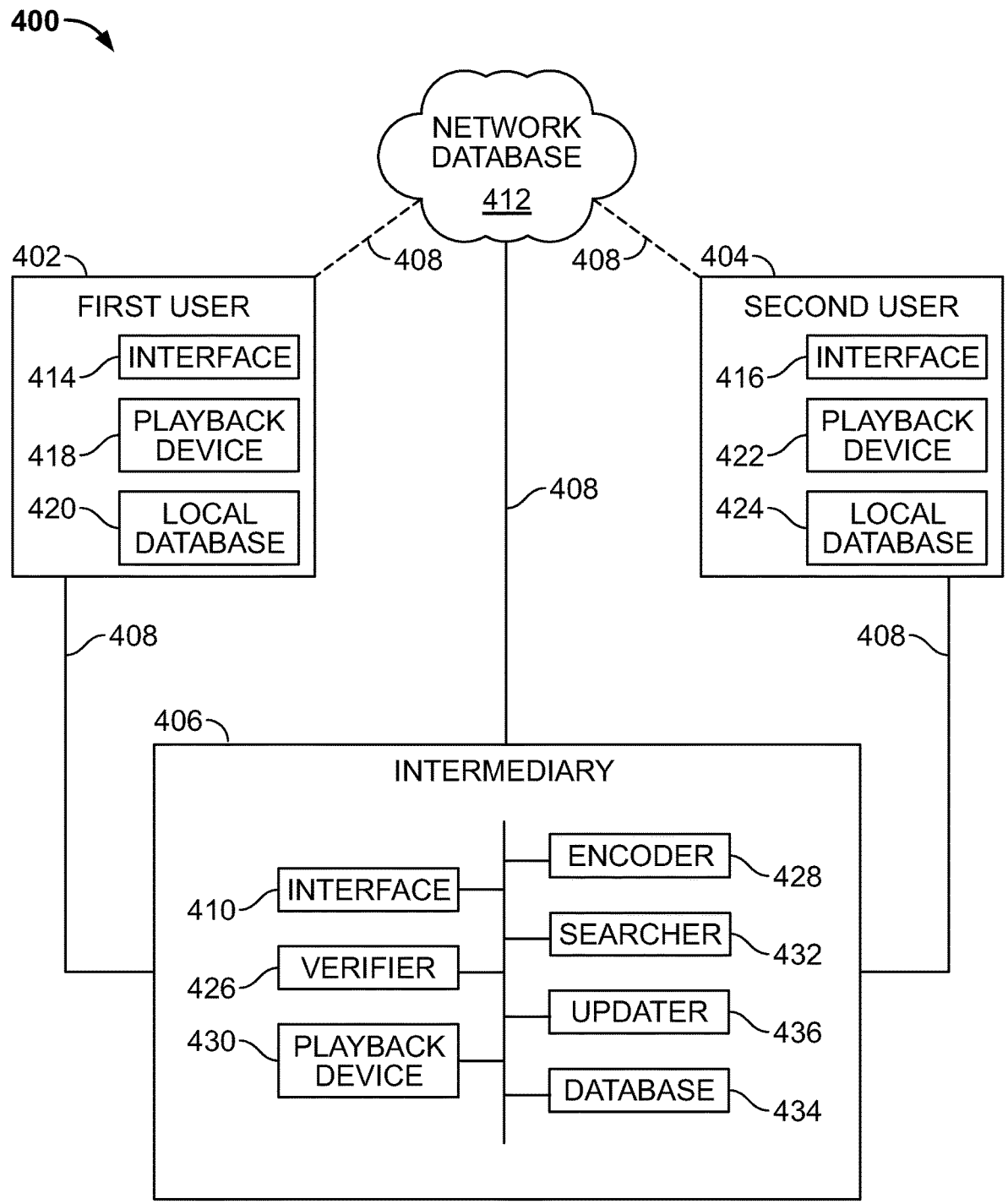
FIG. 4 shows an internal functional block diagram of an example system for sharing files.

Referring now to FIG. 4, there is shown an example functional block diagram of a file or media share or match system 400 in accordance with an embodiment. The file share system 400 may be used, for example, by a user operating any of the zone players 102-124 of FIG. 1. The file share system 400, or aspects thereof, may be used, for example, by a user of a social networking service that may be independent of the system configuration 100 of FIG. 1.

The example system 400 includes a plurality of users, e.g., a first user 402 and a second user 404 that are communicatively coupled to an intermediary 406. The first user 402, the second user 404 and the intermediary 406 are coupled via communication lines 408, which may be, for example, any suitable cable or wireless based communication lines. The first user 402, second user 404 and intermediary 406 may communicate in accordance with any suitable communications protocol including, for example, the Music Open Application Programming Interface (MOAPI). Also, though two users 402, 404 are shown in FIG. 4 any number of users may be communicatively coupled to the intermediary 406.

The example intermediary 406 may be, for example, an online social network and/or file sharing service system that is interconnected between the plurality of users 402, 404. The intermediary 406 may be a web-based subsystem and/or may be applications installed at the users 402, 404. In the example of FIG. 4, the intermediary 406 includes an interface 410, which is used to communicate with the first user 402, the second user 404 and a network database 412 as described in more detail below. In addition, the first user 402 includes a first interface 414, and the second user 404 includes a second interface 416, which are used to facilitate interaction between each of the first user 402 and the second user 404 and the system 400, respectively.

In the example system 400, the first user 402 has a playback device 418, which is any type of device that is used to view, hear, handle, operate, consume or otherwise utilize a file. An example playback device 418 may be the controller 300 described above and/or a computer, a mobile phone, an MP3 player, a tablet, a stereo, a radio, a television or any other suitable device. The file may be, for example, a musical file, a video, a newspaper article, a book, a magazine or any other media. Example musical files include a musical track, an artist, an album a playlist or a genre. The first user includes a library or local database 420 that may store the file. However, in some example, the local database 420 stores an identification of the file and the file is located elsewhere including, for example, on the network database 412, which may be, for example, the Internet. The first user is coupled to the network database 412 via the communication lines 408 discussed above. Also, the second user 404 includes a second playback device 422 and second local database 424, which correlate with features described with respect to the first playback device 418 and first local database 420.

The example playback device 418 operates a service to provide the first user access to the file. For example, the playback device 418 may operate one or more free or paid subscription-based services such as, for example, Spotify™ or Rhapsody™ online streaming music services, Pandora® or Last.fm Internet radio music recommendation services or other radio services. The playback device 418 may also operate using files from the local database 420 such as, for example, iTunes or any other media player computer program. In addition, the playback device 418 may obtain and display files from any website including, for example, YouTube or any other online file sharing website or repository. Also, the playback device 418 may interact with online vendors to obtain files including, for example iTune Store or Napster™.

In an example operation of the example system 400, the first user 402 uses the playback device 418 to consume a first file (e.g., listen to a music track). The first user 402 may wish to recommend the file to the second user 404 or generally recommend the file to any other user in his network or anyone in the public. For example, the first user 402 may wish to recommend a specific music, an entire album, the work of an artist, a particular playlist of music tracks and/or a specific genre of music. In some embodiments, the first user 402 enters an indication that he wants recommend the file, which is transmitted via the interface 414 and communication line 408 to the intermediary 406, which receives the recommendation at the interface 410. The intermediary 406 includes a verifier 426 that detects the service used by the first user. When the service has been detected, an encoder 428 associates a service identification code with the file recommendation based on the service used by the first user 402.

If the recommendation does not name a specific user to whom the recommendation was made, the intermediary 406 may communicate the recommendation for a period of time or perpetually generally to the public or a network of friends of the first user 402. If a user (e.g., the second user 404) wants to investigate the recommendation, i.e., download and consume the file, the second user 404 can send a request for the file via the interface 410 and communication line 408 to the intermediary 406, which is received at the interface 410. The verifier 426 then investigates the second user 404 to determine what service the second user operates to access files. Additionally or alternatively, if the recommendation included a specifically named user (e.g., the second user 404), the verifier 426 could automatically investigate the second user 404 to determine what service the second user operates without waiting for a file request from the second user 404.

The intermediary 406 includes a playback engine 430 to provide the file recommendation with the first service identification code to the second user 404 where the second service and the first service are the same service. Thus, if the first user 402 uses First Service A (e.g., Spotify™) and the second user 404 also uses First Service A (i.e., Spotify™) then the intermediary 406, via the playback engine 430, will pass the file recommendation with the First Service A identification encoded therein to the second user 404, who can then obtain the file via First Service A and consume the file upon receipt.

When the verifier 426 determines that the second user 404 uses Second Service B (e.g., Rhapsody™), the intermediary 406 takes steps to connect the second user 404 with the file because the First Service A encoded file recommendation will not translate to Second Service B. That is, the Second Service B will not recognize the file recommendation because of the First Service A identification. In this example, a searcher 432 searches a local library (e.g., the local database 424) or a network-accessible database (e.g., the Internet) for a second service identification code to associate with the file based on the Second Service B. When located, the encoder associates the second service identification code with the file. In addition, the playback engine 430 provides the file recommendation with the Second Service B identification code to the second user 404. With the recommendation and a recognizable code, Second Service B can locate and present the file to the second user 404. In some examples, the searcher 432 searches the local library (e.g., the local database 424) or the network-accessible database (e.g., the Internet) for the file based on metadata related to the file such as for example, data identifying the title, artist and/or album, regardless of the Second Service B.

When the verifier 426 determines that the second user 404 does not use any service, the intermediary 406 takes steps to connect the second user 404 with the file because the First Service A encoded file recommendation will not translate to a serviceless media player at the second user 404. In this example, the searcher 432 obtains metadata related to the file such as for example, data identifying the title, artist and/or album. With the appropriate metadata, the intermediary 406 can locate the file in the network database 412, obtain the file and present it to the second user 404.

The example intermediary 406 also includes a central database 434 to store a record associating the first service identification code, the second service identification code and/or the metadata with the file recommendation. Thus, in some examples, if the first user 402 and the second user 404 user different services, the intermediary 406 can check the central database 434 to determine if a translation between the different service identification codes was previously mapped, which will save the searcher 432 from having to access the network database 412.

The database may also include a mapping of a list of friends or connections for each user 402, 404 and, therefore, host a social network for the users 402, 404. Furthermore, the example intermediary 406 may include an updater 436 that dynamically informs the users 402, 404 of additional file recommendations recommended by any of the connections in the users' respective networks. The updater 434 periodically checks the connections for new recommendations or receives the recommendations in real time.

Each user 402, 404 can also search inside and outside of their respective social networks for recommendations and/or for further members as potential connections. For example, a user could browse for members and, for each member, manage the connection (e.g., invite the member to be a connection, ignore an invitation or delete a connection), view the member's file (e.g., track, artist, album and/or genre) recommendations. Each user can also browse for file recommended by a specific connection or by all their connections in general. In addition, the users can browse for file recommendations by the entire community, i.e., even those member to whom the user is not connected. The file recommendation searches can be particular to a specific type of file such as, for example, track, artist, album and/or genre. In addition, the searching hierarchy may include a browse node that is a no-op. For example, when an affirmation is made to connect with a member, the intermediary 406 could act to search for recommendations through the new connection's history or otherwise take no other action.

In some examples, when a recommendation citing a specific user is received at the intermediary 406, the playback engine 430 can automatically add the file, via the service identification and recommendation, to a playlist at a playback device of the specified user. In some examples, the playlist is currently playing. That is, in some examples, if a first user 402 recommends a file (e.g., a song) for the second user 404, the playback engine 430 will queue the song for immediate play at the playback device 422 of the second user 404.

In addition, as described in below, the interfaces 410, 414, 416 receive an indication of the enjoyment level of the users 402, 404 with respect to the file, or any other file. The searcher 432 may search for additional file recommendations based on the enjoyment level.

Figure 5:
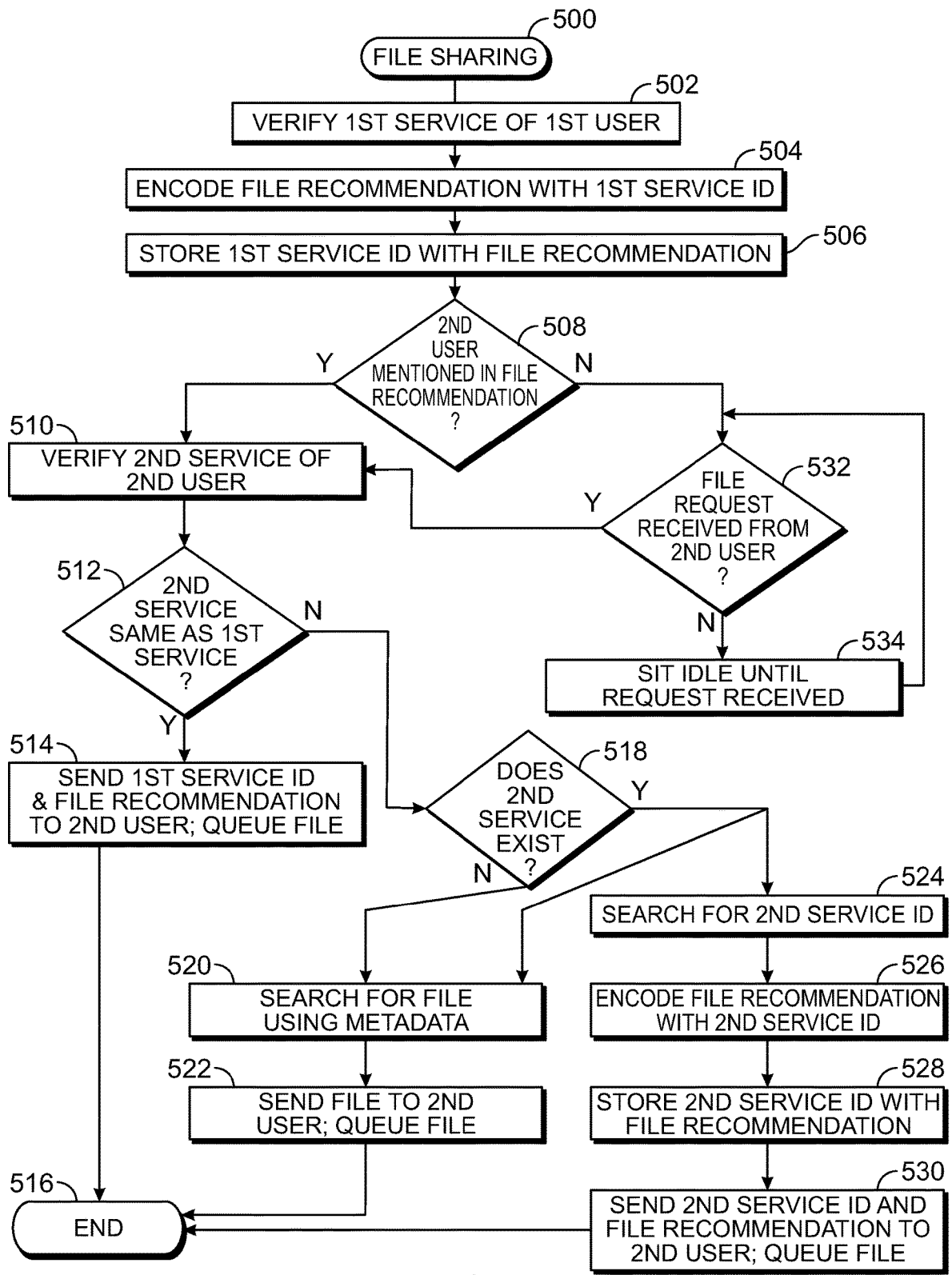
FIG. 5 shows a flow diagram representative of an example method and example machine readable instructions that can be executed to implement the example system of FIG. 4.

FIG. 5 is a flowchart representative of example machine readable instructions that may be executed to implement the example system 400, the example intermediary 406, the example interface 410, the example verifier 426, the example encoder 428, the example searcher 432, the example playback engine 430, the example database 434, the example updater 436 and other components of FIG. 4. In the examples of FIG. 5, the machine readable instructions include a program for execution by a processor such as the processor 712 shown in the example computer 700 discussed below in connection with FIG. 7. The program may be embodied in software stored on a computer readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example system 400, the example intermediary 406, the example interface 410, the example verifier 426, the example encoder 428, the example searcher 432, the example playback engine 430, the example database 434, the example updater 436 and other components of FIG. 4 may alternatively be used. For example, the order of execution of the blocks may be changed, and/or some of the blocks described may be changed, eliminated, or combined.

As mentioned above, the example processes of FIG. 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 5 illustrates an example method of sharing or matching a file or media (block 500). The example method 500 may be used to recommend a file such as a music track from one user to another user. When a first user (e.g., the first user 402 of FIG. 4) recommends a file (e.g., a music track) a file recommendation is submitted, and the example method 500 verifies the first service used by the first user to access the file (block 502). The file recommendation is encoded (e.g., by the encoder 428 of FIG. 4) with a first service identification based on the first service (block 504). The file recommendation is stored with the first identification code in a database (e.g., the database 434) (block 506).

A "reference" or "recommendation" from a user may be an active reference or recommendation. For example, the user may explicitly offer a particular recommendation (e.g., "John likes 'Our Love is Here to Stay' by Bill Evans"). In some embodiments, a "reference" or "recommendation" may be based on some other defined criteria, if the user allows such information to be shared. For example, the user's listening habits using a device of the sort described with respect to the system configuration 100 might be tracked and offered as a user specific recommendation (e.g., "John listens to 'Seal it With a Kiss' by Britney Spears") or a general public-type recommendation. That is, the system may track what the user is actually listening to through the system (a benefit of this embodiment can include a wider range of listening data, because the audio may come from a number of different sources and be played through the system) and provide that information in the form of a reference recommendation. Regardless of whether the reference or recommendation is an active or not, the reference or recommendation may be made in real-time (as the user is listening to the music) if so desired.

The example method 500 determines if a second user (e.g., the second user 404) is mentioned in the file recommendation by the first user (block 508). If the second user is mentioned by the first user in the file recommendation, the process 500 continues to verify the second service used by the second user to access files (block 510). The process 500 determines if the second service is the same as the first service (block 512). If the second service is the same as the first service, i.e., if both the first user and the second user use the same service to access files (e.g., play streaming music), the file recommendation with the first service ID (which would be the same as or substantially similar to the second service ID in this example) is sent to the second user and the file is queued for consumption (e.g., play) by the second user (block 514). The first service identification code may include a URL, tinyURL and/or any other suitable pointer to the file. The process 500 then ends (block 516) until the next recommendation is received or another recommendation is processed.

If, when the second service of the second user is verified (block 510), it is determined that the second service of the second user is not the same as the first service used by the first user (block 512), the process determines if any second service exists, i.e., if the second user uses any particular service for accessing files (block 518). If the second user does not use or subscribe to a second service (or the first service), the process 500 searches for the recommended file via metadata that is associated with or encoded with the file recommendation by, for example, the encoder 428 of FIG. 4 (block 520) so that the process 500 can connect the second user with the recommended file by matching the file recommended by the first user using the first service with the file as hosted by an alternative service. In some examples, the process 500 searches using, for example, a music track title, on a free music access service. When the recommended file is located, the file is downloaded and/or a link to the file is sent to the second user, and the file is queued for consumption by the second user (block 522). The process 500 then ends (block 516) until the next recommendation is received or another recommendation is processed.

If, when the second service of the second user is verified (block 510), it is determined that the second service of the second user is not the same as the first service used by the first user (block 512) and the second service exists, i.e., the second user uses a second, different, service to access files (block 518), the process 500 searches (e.g., with the searcher 432) for a second service identification code for the recommended file (block 524). The second service identification code may include a URL, tinyURL and/or any other suitable pointer to the file. The file recommendation is encoded with the second service identification (block 526) using, for example, the encoder 428 so that the process 500 can connect the second user with the recommended file by matching the file recommended by the first user using the first service with the file as hosted by the second service. In addition, the file recommendation with the second service identification is stored (block 528) in, for example, the database 434. In some examples, the database 434 may serve as a translator between two services to match files between the two services if, for example, the database 434 includes service codes for two services related to the same recommended file. The process 500 then sends the second service identification and associated file recommendation to the second user and queues the recommended file for consumption by the second user (block 530). The process 500 then ends (block 516) until the next recommendation is received or another recommendation is processed.

In some examples, the process 500 does not search for a second service identification code even though the second user uses a second service to access files. In such embodiments, the process 500 may identify the file from the file recommendation such as, for example, via the first service identification or metadata, and the process 500 may use the second service to access the file. Thus, after determining that the second service exists (block 518), the example process 500 may search for the file or a pointer to the file using metadata (block 520). For example, after reading the file recommendation for a music track, the process 500 may determine the title, author and/or album of the recommended music track. With this information, the process 500 can access the second service to obtain or locate the recommended music track so that the process 500 can connect the second user with the recommended file by matching the file recommended by the first user using the first service with the file as hosted by the second service without obtaining or employing a second service identification code. In this example, the process 500 may also search for the file or a pointer to the file on a free service, regardless of the presence of the second service.

In some examples, the process 500 determines that the second user is not mentioned in the file recommendation (block 508). For example, the first user may indicate that he likes a certain file, he may recommend the file to no other user in particular but, rather, to the network or community at large, or the user's currently used files (e.g., currently played music tracks) are automatically mentioned in a file recommendation. When no second user is identified in a file recommendation (block 508), the example process 500 determines if a second user (or third user, fourth user, etc.)

requests the recommended file (block 532). If a second user requests the recommended file, control of the example process 500 returns to block 510 where the second service of the second user is verified. If a second user does not request the recommended file, the process 500 will sit idle (for this particular file recommendation) (block 534) until it is determined that a second user requests the recommended file (block 532).

Figure 6:
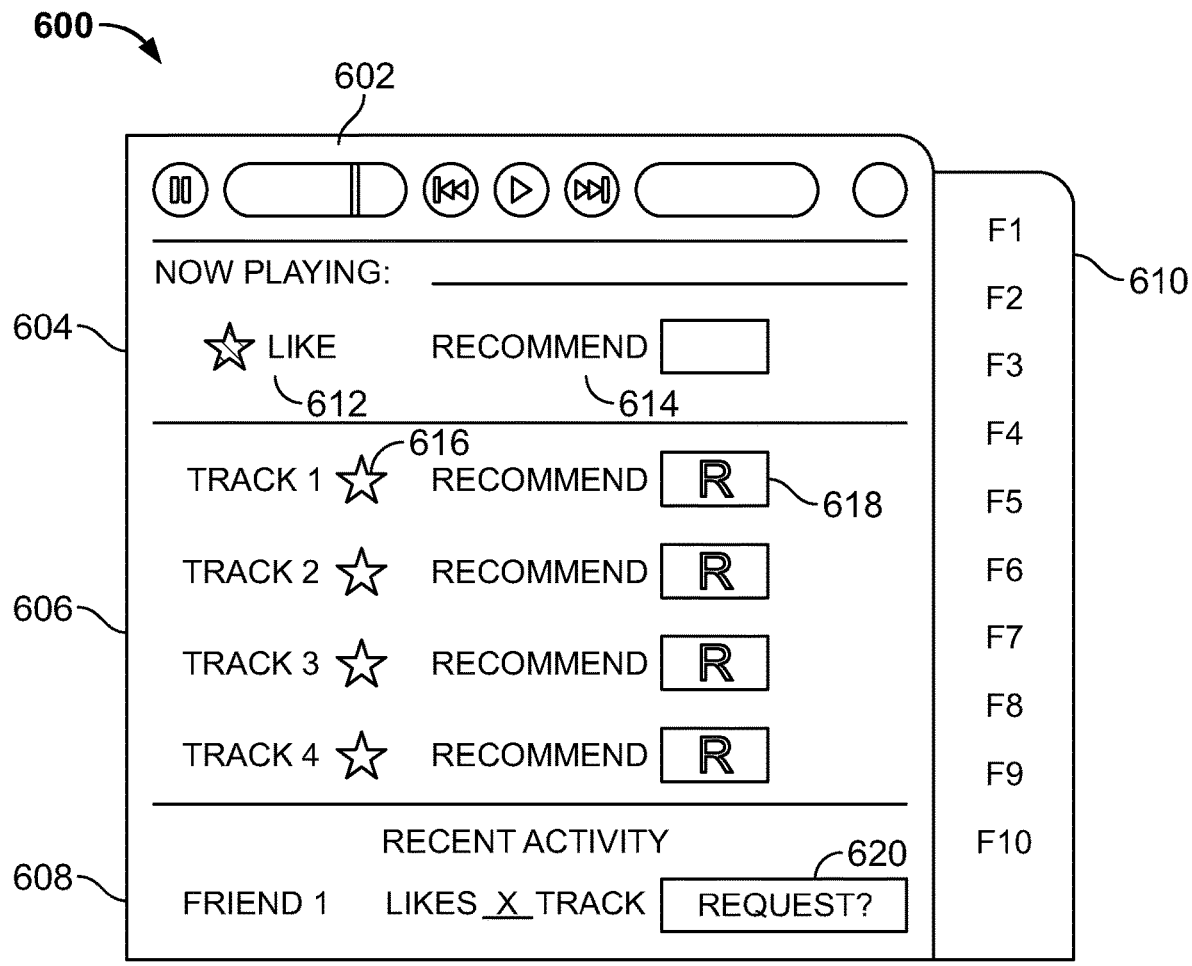
FIG. 6 shows a block diagram of an example user interface associated with the example system of FIG. 4.

FIG. 6 shows an example graphical user interface 600, which may be implemented, for example on the playback devices 418, 422 of the first and second user 402, 404, respectively and/or the controller 300 described above. The example graphical user interface 600 shows a screen with several panels including a file control panel 602, a current status panel 604, a queue panel 606, a network update panel 608 and a network list panel 610. Any number of panels may be added, removed, rearranged etc. to create any type of graphical user interface. In addition, each user may customize the graphical user interface for his or her particular needs and/or preferences.

The control panel 602 includes buttons or keys to control the use of a file including, for example, playing, stopping or pausing of a music track, skipping to the next track, repeating a track and controlling a volume.

Current status panel 604 shows a file that is currently being used. The current status panel 604 also includes an icon or button 612 that the user can activate to indicate that a file is enjoyed. The current status panel 604 also includes an icon or button 614 to indicate that the user would like to recommend the current file. If the user activates the recommend button 616, the user may be prompted to provide additional information such as, for example, a specific user to whom the user wants to recommend the file.

The queue panel 606 shows other files that are in position for being used. The queue may change dynamically, for example, based on the acceptance or receipt of a recommended file as detailed above. In addition, the queue panel 606 includes icons 616 to indicate that a user likes a specific file and recommend buttons 618 to recommend the file, though the file is not currently being used or consumed.

The network update panel 608 shows recent activity of connections in the user's network. Though only one activity is shown in the graphical user interface 600 of FIG. 6, any number of activities including, for example, a scrolling thread may appear as well. The network update panel 608 in this example shows that a friend or connection (e.g., Friend 1) likes a certain file (e.g., X music track). The user is prompted in the network update panel 608 to request the file if desired by activating the request icon 620. The network update panel 608 may include information related to recommendation made specifically to the user or any other activity in the user's network or that is otherwise public including, for example, activity between two of the user's connections.

The network list panel 610 shows a list of the friends or connections in the user's network. In the example, friends F1-F10 are shown, but the network list panel 610 could include a scrolling list. In addition, the user may interact with or view history activity of the connections listed in the network list panel 610 by selecting a particular connection. In addition, the user may provide recommended files for a particular connection by dragging a file name and dropping on the connection's name. One of ordinary skill in the art will appreciate that the example graphical user interface 600 of FIG. 6 may be manipulated and altered in many ways.

As described above, certain embodiments disclosed herein enable media sharing such as, for example, music sharing in a social context that includes cross-linking, i.e., matching music or other media files between different media access services. Traditional social networks such as, for example, Twitter or Facebook, are directed to sharing textual information, i.e., a text string that indicates what a user is doing, what a user enjoys, what music a user is listening to, etc. The examples disclosed herein allow the actual music file to be shared and/or allow a music file to be matched between different music access services. These examples may be implemented using web-accessible systems including, for example, the systems of FIGS. 1-4, described above. In these examples, one account holder or user using a first music service including subscription-based services (e.g., Rhapsody) may share songs with other account holder, and the systems described herein include search capabilities that enable sharing and/or matching of music across music services or in a local library by searching, for example, an artist, a title and/or an album.

In certain embodiments, a MOAPI (Music Open Application Programming Interface) based music service is established. Users that wish to join the service request an account. In some examples, there is no initial web page to go to first to create credentials, a user can choose a username and password from a controller, which, if available, becomes the user's account. In some examples, a standard like OpenAuth (Initiative for Open Authentication) may be employed.

In some examples, on a 'Now Playing' screen (e.g., the interface 600 of FIG. 6), a user can choose to "recommend" media (e.g., an artist/album/track). The recommendation initiates one or more transactions including, for example, adding or encoding a service-specific identifier to a database for the user's connections. Thus, if a user recommends a file in from one service (e.g., a Rhapsody track), the example systems and methods described herein encodes the first service identification code (e.g. Rhapsody ID) in the recommendation, so that when any of the user's connections sees what the user recommended, the recommended file (e.g., music track) will play if the connection happens to have the same file access service (i.e., in this example, Rhapsody). Firmware adaptations may be used to execute web-based searches and/or to decode any encoded service identification codes.

In some examples, as described above, the system boasts an address book, which includes a list of the connections of a user. In some examples, the address book is stored at a central server (e.g., at the central database 434).

In some examples, a user's connections may not use the same service to access files that the user uses. For example, one connection of the user may use the Spotify service to access and/or play music tracks while the user uses the Rhapsody service. In some examples, the example system allows for files (e.g., music tracks) on one service to be played on another via one or more of the searches described herein. For example, when system (e.g., the intermediary 406) receives an identification for a shared track (e.g., a recommended music track) from the user and discovers (e.g., via the verifier 426) that the connection (i.e., second user) does not have a subscription to the first service (e.g., the connection does not subscribe to Rhapsody), the system may request metadata (e.g., album, artist and/or title) for the music track and conduct a search on whatever service the connection uses (in this example, Spotify) and/or also search the connection's local library.

In addition, in some examples, a list of files (e.g., artists/albums/tracks) that the connections of a user have recommended is treated by the system (e.g., by the intermediary 406) as a library item. This facilitates the dynamic updating of what a user's connections have recommended as the recommendations occur. An example search via a user's connections may include:

```
Friends
    Search
        Members
            <member username>
                Invite to be my Friend
                Artist Recommendations
                Album Recommendations
                Track Recommendations
            Artists Recommended by my Friends
            Albums Recommended by my Friends
            Tracks Recommended by my Friends
        My Friends
            <friend username>
                Artist Recommendations
                    <Artists>
                        <Albums>
                            <Tracks>
                Album Recommendations
                    <Albums>
                        <Tracks>
                Track Recommendations
                    <Tracks>
            Artist Recommendations
                <Artists>
                    <Albums>
                        <Tracks>
            Album Recommendations
                <Albums>
                    <Tracks>
            Track Recommendations
                <Tracks>
        Friend Requests
            <member username>
                Allow
                Ignore
```

In some examples, to implement this browse hierarchy no-op browse node may be used. Also, when a user clicks on "Allow" for a friend request, for example, the server (e.g., the intermediary 406) could implement a search related to the newly accepted friend/connection including, for example, file recommendations.

In some examples, when a user browses into artists/albums/track, the identifications that are provided to the system may include the specially encoded identifications described herein that specifically include the music service. In addition, in some examples, the encoding may even include the service name with the track title, e.g., "Track name (on Rhapsody)".

In some examples, a file recommendation is created and/or transmitted to a user's network and/or to other social networks the user is associated with for files added to a queue or played. For example, a user may also have a Twitter account and a communication (such as, for example, a tweet on Twitter) may be sent for any or all music tracks added to a user's queue and/or for any or all track a user plays. Also, in some examples, the systems described herein may send communications to other social networks and/or receive communications therefrom. For example, the intermediary 406 may act as a Twitter sender where the receipt of the tweet occurs in the usual way (e.g. mobile phone or web browser). In some examples, the example intermediary 406 may act as a Twitter receiver to allow the recipient (e.g., the user) to directly add a recommended track or album to his or her library or queue.

Also, as detailed above, in some examples, users opt-in to a system/service by publishing a username and profile and adding other users to a connections/friends list, which includes a feature or process for finding friends, approving adding a friend, and syncing or updating friend lists.

In some examples, when a user plays a track, the systems described herein provide a feature or process to share the music with one or more friend(s). Also, in some examples, the systems described herein obtain music the user's friends shared with the user. In some examples, the user may press or click a button on his or her controller to "recommend" a track, album, artist, station (e.g., Pandora, Last.FM, or other radio station) to his or her friends (i.e., connections or followers). For example, if a user is listening to a track on Rhapsody and presses the "recommend" button, a menu may appears that offers the user additional options for instigating and/or customizing the recommendation including, for example, an indication to choose to recommend the track, an indication to choose to recommend the album, an indication to choose to recommend to artist, an indication to choose to recommend the station, etc. The user could also choose to send a customize message with the recommendation throughout the network, to a particular other user and/or to another network (e.g., Facebook or Twitter) such as, for example one or more tweets that broadcast the recommendation (e.g., "I'm enjoying the track 'Knock 'Em Out' on the Album 'Alright, Still' by Lily Allen on my Sonos system."; "I'm enjoying the Album 'Alright, Still' by Lily Allen on my Sonos system."; "I'm enjoying listening to Lily Allen on my Sonos system."; and/or "I'm enjoying listening to Bruce Springsteen Radio on my Sonos system.").

In some examples, the example systems include an interface to enable the user to input account information for other social network sites (e.g., for the user to enter Twitter or Facebook account information). Also, in some examples, the example system includes a user interface button on, for example, a "Now Playing" screen that guides the user through menu options, as described above. In addition, in some examples, the example system includes a common code that takes the request arguments or recommendation and sends an API to the other social networks coupled to the user's account. Also, in some examples, an option is included for the user to provide a preference to indicate which of any other social networks coupled to the user's account to send recommendations (e.g., to Twitter, Facebook, or both).

In some examples, the example system adapts the recommendation to a format associated with any other social network including, for example, limiting recommendations to 140 characters or less for Twitter. Also, in some examples, the example system automatically, includes URLs for the recommended track/station streams and/or tinyURLs (e.g., for Twitter).

The example systems and methods described herein also enable users across various geographic territories including, for example, different countries to share files. For example, a user in the US could recommend a music track to a user in Sweden (regardless of the services each user uses to access music, as detailed above), and the user in Sweden could use the recommendation to queue, point to, obtain, download, play or comment about the music track. In some examples, the example system enables the sharing or matching of files despite licensing agreements containing territory-specific restrictions on the files (e.g., songs) because the example system uses the second service used by the recipient/second user to match the recommended file with a file in the second service and, thus, in accordance with the user license obtained by the second user with the second service. Thus, in such examples, a global mapping system is applied.

Figure 7:
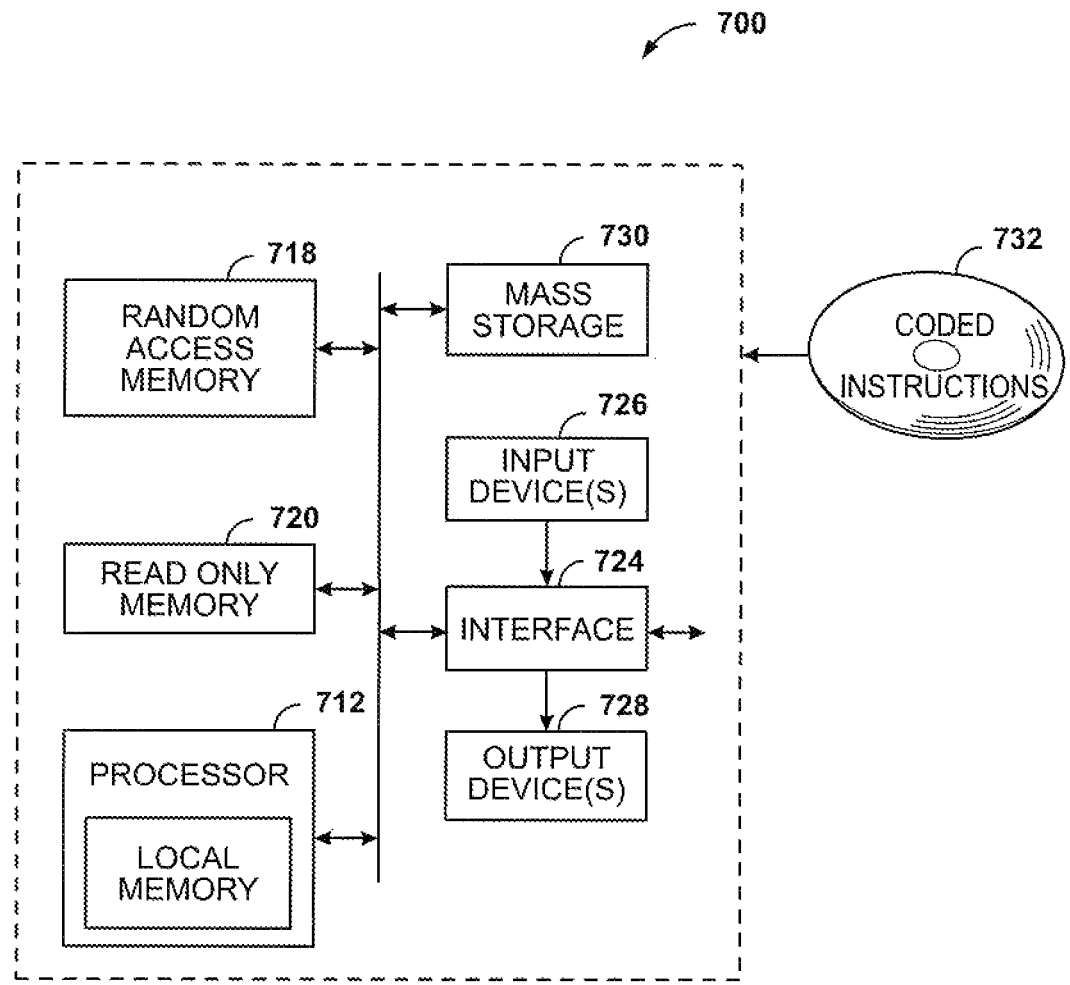
FIG. 7 is an example processor platform capable of implementing the example system of FIG. 4 and/or the methods and instructions of FIG. 6.

FIG. 7 is a block diagram of an example computer 700 capable of executing the instructions of FIG. 5 to implement the example system 400, the example intermediary 406, the example interface 410, the example verifier 426, the example encoder 428, the example searcher 432, the example playback engine 430, the example database 434, the example updater 436 and other components of FIG. 4. The computer 700 can be, for example, a server, a personal computer, a mobile phone (e.g., a cell phone), a personal digital assistant (PDA), an Internet appliance, a set top box, or any other type of computing device.

The computer 700 of the instant example includes a processor 712. For example, the processor 712 can be implemented by one or more Intel® microprocessors from the Pentium® family, the Itanium® family or the XScale® family. Of course, other processors from other families are also appropriate.

The processor 712 is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is typically controlled by a memory controller (not shown).

The computer 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device (e.g., the request servicer) such as a modem or network interface card to facilitate exchange of data with external computers via a network 726 (e.g., an Ethernet connection, a digital subscriber line (DSL), a telephone line, coaxial cable, a cellular telephone system, etc.).

The computer 700 also includes one or more mass storage devices 728 for storing software and data. Examples of such mass storage devices 728 include floppy disk drives, hard drive disks, compact disk drives, and digital versatile disk (DVD) drives. The mass storage device 728 may implement the storage database 420, 424, 434.

The coded instructions of FIG. 7 may be stored in the mass storage device 728, in the volatile memory 714, in the non-volatile memory 716, and/or on a removable storage medium such as a CD or DVD.

Various inventions have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the present disclosure as claimed. While the embodiments discussed herein may appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

The invention claimed is:

1. A computing system comprising:
   at least one processor;
   at least one non-transitory computer-readable medium; and
   program instructions stored on the at least one non-transitory computer-readable medium that are executable by the at least one processor such that the computing system is configured to:
      receive, from a first user device registered with a first service account of a first service, a first pointer to a particular media item available via the first service, wherein the first pointer is usable to retrieve the particular media item from the first service for playback;
      receive, from the first user device, an indication of a user selection of a selectable icon of a graphical user interface of the first user device, wherein the user selection indicates a request to share the particular media item;
      determine a second service account with which the particular media item is to be shared;
      determine that the second service account has access to the particular media item via a second service; and
      based on the determination that the second service account has access to the particular media item via the second service:
         identify a second pointer to the particular media item available via the second service, wherein the second pointer is usable to retrieve the particular media item from the second service for playback; and
         transmit the second pointer to a second user device registered with the second service account.

2. The computing system of claim 1, further comprising program instructions stored on the at least one non-transitory computer-readable medium that are executable by the at least one processor such that the computing system is configured to:
   based on a determination that the second service account has access to the particular media item via the first service, transmit the first pointer to the second user device registered with the second service account.

3. The computing system of claim 1, wherein:
   the selectable icon of the graphical user interface is a first selectable icon;
   the computing system further comprises program instructions stored on the at least one non-transitory computer-readable medium that are executable by the at least one processor such that the computing system is configured to receive, from the first user device, an indication of a user selection of a second selectable icon of the graphical user interface of the first user device, wherein the user selection of the second selectable icon indicates the second service account; and
   the program instructions that are executable by the at least one processor such that the computing system is configured to determine the second service account with which the particular media item is to be shared comprise program instructions that are executable by the at least one processor such that the computing system is configured to determine the second service account based on the indication of the second service account received from the first user device.

4. The computing system of claim 1, wherein:
the computing system further comprises program instructions stored on the at least one non-transitory computer-readable medium that are executable by the at least one processor such that the computing system is configured to receive, from the second user device, an indication of a user selection of a selectable icon of a graphical user interface of the second user device, wherein the user selection of the selectable icon of the graphical user interface of the second user device indicates a request for the particular media item; and
the program instructions that are executable by the at least one processor such that the computing system is configured to determine the second service account with which the particular media item is to be shared comprise program instructions that are executable by the at least one processor such that the computing system is configured to determine the second service account based on the request for the particular media item.

5. The computing system of claim 1, wherein the program instructions that are executable by the at least one processor such that the computing system is configured to receive the first pointer from the first user device comprise program instructions that are executable by the at least one processor such that the computing system is configured to receive the first pointer from the first user device based on an input received via the first user device.

6. The computing system of claim 5, wherein the selectable icon of the graphical user interface of the first user device is a first selectable icon, and wherein the program instructions that are executable by the at least one processor such that the computing system is configured to receive the first pointer from the first user device based on the input received via the first user device comprise program instructions that are executable by the at least one processor such that the computing system is configured to receive the first pointer based on an indication of a user selection of a second selectable icon of the graphical user interface of the first user device, wherein the second selectable icon corresponds to the particular media item.

7. The computing system of claim 1, wherein the first pointer comprises a uniform resource locator (URL) or a uniform resource indicator (URI).

8. A non-transitory computer-readable medium, wherein the non-transitory computer-readable medium is provisioned with program instructions that, when executed by at least one processor, cause a computing system to:
receive, from a first user device registered with a first service account of a first service, a first pointer to a particular media item available via the first service, wherein the first pointer is usable to retrieve the particular media item from the first service for playback;
receive, from the first user device, an indication of a user selection of a selectable icon of a graphical user interface of the first user device, wherein the user selection indicates a request to share the particular media item;
determine a second service account with which the particular media item is to be shared;
determine that the second service account has access to the particular media item via a second service; and
based on the determination that the second service account has access to the particular media item via the second service:
identify a second pointer to the particular media item available via the second service, wherein the second pointer is usable to retrieve the particular media item from the second service for playback; and
transmit the second pointer to a second user device registered with the second service account.

9. The non-transitory computer-readable medium of claim 8, wherein the non-transitory computer-readable medium is also provisioned with program instructions that, when executed by at least one processor, cause the computing system to:
based on a determination that the second service account has access to the particular media item via the first service, transmit the first pointer to the second user device registered with the second service account.

10. The non-transitory computer-readable medium of claim 8, wherein:
the selectable icon of the graphical user interface is a first selectable icon;
the non-transitory computer-readable medium is also provisioned with program instructions that, when executed by at least one processor, cause the computing system to receive, from the first user device, an indication of a user selection of a second selectable icon of the graphical user interface of the first user device, wherein the user selection of the second selectable icon indicates the second service account; and
the program instructions that, when executed by at least one processor, cause the computing system to determine the second service account with which the particular media item is to be shared comprise program instructions that, when executed by at least one processor, cause the computing system to determine the second service account based on the indication of the second service account received from the first user device.

11. The non-transitory computer-readable medium of claim 8, wherein:
the non-transitory computer-readable medium is also provisioned with program instructions that, when executed by at least one processor, cause the computing system to receive, from the second user device, an indication of a user selection of a selectable icon of a graphical user interface of the second user device, wherein the user selection of the selectable icon of the graphical user interface of the second user device indicates a request for the particular media item; and
the program instructions that, when executed by at least one processor, cause the computing system to determine the second service account with which the particular media item is to be shared comprise program instructions that, when executed by at least one processor, cause the computing system to determine the second service account based on the request for the particular media item.

12. The non-transitory computer-readable medium of claim 8, wherein the program instructions that, when executed by at least one processor, cause the computing system to receive the first pointer from the first user device comprise program instructions that, when executed by at least one processor, cause the computing system to receive the first pointer from the first user device based on an input received via the first user device.

13. The non-transitory computer-readable medium of claim 12, wherein the selectable icon of the graphical user interface of the first user device is a first selectable icon, and wherein the program instructions that, when executed by at least one processor, cause the computing system to receive the first pointer from the first user device based on the input received via the first user device comprise program instructions that, when executed by at least one processor, cause the computing system to receive the first pointer based on an indication of a user selection of a second selectable icon of the graphical user interface of the first user device, wherein the second selectable icon corresponds to the particular media item.

14. The non-transitory computer-readable medium of claim 8, wherein the first pointer comprises a uniform resource locator (URL) or a uniform resource indicator (URI).

15. A method to be performed by a computing system, the method comprising:
 receiving, from a first user device registered with a first service account of a first service, a first pointer to a particular media item available via the first service, wherein the first pointer is usable to retrieve the particular media item from the first service for playback;
 receiving, from the first user device, an indication of a user selection of a selectable icon of a graphical user interface of the first user device, wherein the user selection indicates a request to share the particular media item;
 determining a second service account with which the particular media item is to be shared;
 determining that the second service account has access to the particular media item via a second service; and
 based on the determination that the second service account has access to the particular media item via the second service:
  identifying a second pointer to the particular media item available via the second service, wherein the second pointer is usable to retrieve the particular media item from the second service for playback; and
  transmitting the second pointer to a second user device registered with the second service account.

16. The method of claim 15, further comprising:
 based on a determination that the second service account has access to the particular media item via the first service, transmitting the first pointer to the second user device registered with the second service account.

17. The method of claim 15, wherein:
 the selectable icon of the graphical user interface is a first selectable icon;
 the method further comprises receiving, from the first user device, an indication of a user selection of a second selectable icon of the graphical user interface of the first user device, wherein the user selection of the second selectable icon indicates the second service account; and
 determining the second service account with which the particular media item is to be shared comprises determining the second service account based on the indication of the second service account received from the first user device.

18. The method of claim 15, further comprising:
 receiving, from the second user device, an indication of a user selection of a selectable icon of a graphical user interface of the second user device, wherein the user selection of the selectable icon of the graphical user interface of the second user device indicates a request for the particular media item,
 wherein determining the second service account with which the particular media item is to be shared comprises determining the second service account based on the request for the particular media item.

19. The method of claim 15, wherein receiving the first pointer from the first user device comprises receiving the first pointer from the first user device based on an input received via the first user device.

20. The method of claim 19, wherein the selectable icon of the graphical user interface of the first user device is a first selectable icon, and wherein receiving the first pointer from the first user device based on the input received via the first user device comprises receiving the first pointer based on an indication of a user selection of a second selectable icon of the graphical user interface of the first user device, wherein the second selectable icon corresponds to the particular media item.

\* \* \* \* \*